United States Patent
Takaoka et al.

[15] 3,691,111
[45] Sept. 12, 1972

[54] EPIHALOHYDRIN POLYMERS

[72] Inventors: Tsuneo Takaoka, Chigasaki-shi; Tetsuya Ohta, Fujisawa-shi; Masaru Itoh, Chigasaki-shi, all of Japan

[73] Assignee: Nippon Oil Seal Industry Co. Ltd., Minato-ky, Tokyo-to, Japan

[22] Filed: Nov. 28, 1969

[21] Appl. No.: 880,989

[30] Foreign Application Priority Data

Dec. 19, 1968    Japan .......................43/92683

[52] U.S. Cl. ..............................260/2 A, 252/431 R
[51] Int. Cl. .............................................C08g 23/14
[58] Field of Search...........................260/2 EP, 615 B

[56] References Cited

UNITED STATES PATENTS

| | | |
|---|---|---|
| 3,275,573 | 9/1966 | Vandenberg...................260/2 |
| 3,383,333 | 5/1968 | Hsieh.............................260/2 |
| 3,324,051 | 6/1967 | Lal................................260/2 |
| 3,541,065 | 11/1970 | Elmer et al. ...............260/88.3 |

*Primary Examiner*—William H. Short
*Assistant Examiner*—E. Nielsen
*Attorney*—Holman and Stern

[57]    ABSTRACT

Production of epihalohydrin polymers using a catalyst system including an organoaluminum compound and sulfur wherein the sulfur/aluminum atomic ratio is from about 0.05 to 0.8.

5 Claims, No Drawings

EPIHALOHYDRIN POLYMERS

The present invention relates to a method of producing epihalohydrin polymers and more particularly to a method of producing epihalohydrin polymers with the use of a catalyst system consisting of an organoaluminum compound and sulfur.

Epihalohydrin polymers, especially the homopolymers and copolymers of amorphous (acetone-soluble) and high molecular weight polyepihalohydrin, are an important component of epihalohydrin rubber (polyether-halide rubbers) which are vulcanized to provide excellent ozone-resistance, gas-impermeability, oil-resistance and heat resistance.

Some catalysts are known for the polymerization of epihalohydrin. Joginder Lal, in an article titled "Polymerization of Olefin Oxides and of Olefin Sulfides," in the *Journal of Polymer Science*, Part A–1, Vol. 4, (1966), pp. 1163 to 1177, for example, discloses a catalyst system comprising an organometallic compound and sulfur in which the polymerization of epihalohydrin is conducted at a sulfur/zinc atomic ratio of 4 with the use of diethylzinc as the organometallic compound. The article reports that with this catalyst system only oily substances (their inherent viscosity: 0.05) are produced at a yield of only 4 percent and further that the yield was increased up to 70 percent in the bulk polymerization at sulfur/aluminum atomic ratio of 4 by the aid of triisobutylaluminum in place of diethylzinc but with the result that the inherent viscosity of the produced polymer was still as low as 0.14.

As a result of studies on the polymerization of epihalohydrin with a catalyst system comprising an organoaluminum compound and sulfur, it has now been found that the employment of an organoaluminum compound as the primary catalyst component and sulfur as the secondary catalyst component in a given proportion leads to the production of high molecular polymers containing significant quantities of amorphous polymers.

In the method of producing epihalohydrin polymers according to the present invention, the polymerization of epihalohydrin is carried out in the presence of a catalyst consisting of an organoaluminum compound and sulfur at a sulfur/aluminum atomic ratio of from 0.05 to 0.8.

Exemplary organoaluminum compounds useful as the primary catalyst component according to the instant invention include trialkylaluminum, dialkylaluminum monohalide, alkylaluminum sesqui halide, alkylaluminum mono-hydride, their cycloalkyl homologs, their aryl homologs and so forth. Trialkylaluminum is preferred and triisobutylaluminum is particularly desirable. The complexes of the foregoing compounds and tetrahydrofuran, ether, etc. may also be used.

Sulfur, the other basic component of the catalyst, may be solid sulfur of high purity without a special treatment thereof.

To the catalyst system may be added compounds as chelating agents which may be selected from those having —OH or —SH radicals and carbonyl, ester, carboxyl, sulfoxy, sulfo, amino, thiocarbonyl, thiocarboxy, thioester radicals, etc. An example of such compounds is acetylacetone. Other examples of such compounds are disclosed in Japanese Patent No. 1969–15797, the subject matter of which is incorporated herein by reference.

The catalyst system is prepared by adding, first, sulfur, then, a complexing agent or a chelating agent, if necessary, and, last an organoaluminum compound to the reaction system. An organoaluminum compound as catalyst component is usually used at a molecular ratio of the organoaluminum compound to the monomer of from about 0.01 to 0.1, although this range is not restrictive. The molecular ratio of the complex agent, the chelating agent, and so on to the organoaluminum compound is the same as that of those contained in the existing catalyst system.

Acetone-soluble epihalohydrin polymers of a desired high molecular weight are obtained at a high yield at a molecular ratio of sulfur to the organoaluminum compound, in other words, the sulfur/aluminum atomic ratio in these catalyst component, of from 0.05 to 0.8, preferably from 0.1 to 0.7. The most desirable results are shown in the vicinity of the range of from 0.2 to 0.5. This range may vary somewhat depending upon the type of aluminum compound and the solvent employed and so forth but a range from 0.1 to 0.8, is, generally, to be selected as effective. The yield of methanol-insoluble polymers containing acetone-soluble polymers rapidly decreases at a sulfur/aluminum atomic ratio of more than 0.8, while the yield of the methanol-insoluble polymers does not decrease when a catalyst consisting only of an organoaluminum, that is, without sulfur, is used, but the resultant polymers are often of viscous rubber-like nature, which is not always desirable, and their acetone-soluble parts are low in reduced viscosity. The addition of sulfur to this catalyst at a sulfur/aluminum atomic ratio of more than 0.05 produces the surprising result that the resultant methanol-in-soluble polymer has the nature of a rubber-like elastomer with a rise in the reduced viscosity of its acetone-soluble portion.

NMR (Nuclear Magnetic Resonance) spectrum analysis of the catalyst system at a sulfur/aluminum atomic ratio of from 0.05 to 0.8 and more than 0.8 shows a noticeable difference between the two. For example, in the NMR spectrum analysis of the triisobutylaluminum-sulfur catalyst system formed in a benzene solution with a variety of the sulfur/aluminum atomic ratios, the chemical shift of methylene radical without sulfur is near 9.7 ppm, while that of methylene radical reacted with sulfur is near 7.4 ppm. (The identification of this methylene radical reacted with sulfur is done through the NMR spectrum of the reaction product of triisobutylaluminum and ethyl mercaptan.) The ratio of spectrum area of these two methylene radicals is smaller (near 0.15) at a sulfur/aluminum atomic ratio of from 0.2 to 0.5 and larger (near 3.5) at a sulfur/aluminum atomic ratio of more than 1.0. There is between the two ranges a point which is deemed to be the discontinuous point, before and after which a result of an entirely different nature is produced through the polymerization. It is, therefore, believed that in the organoaluminum compound-sulfur catalyst system high or low polymerization-activity catalyst species are obtained depending upon the atomic ratio of sulfur to aluminum contained in the respective catalyst components to form the reaction product of a different nature.

Polymerization of epihalohydrin is generally conducted at temperatures from 0° C. to 50° C in a solvent such as an inert hydrocarbon or a halogenated hydrocarbon usually employed for reactions of this kind. When conducted in an inert atmosphere, any polymerization method may be employed with no particular requirement of pressure. Usable solvents include hydrocarbons such as benzene, toluene, xylene, n-heptane and n-hexane or hydrocarbon halides such as 1,2-dichloroethane, 1,2-dichloroethylene, monochloro benzene and dichlorobenzene. The quantity of solvent is about 1 to 8 times and preferably about 2.5 to 5 times the monomer (in volume).

The method of producing epihalohydrin polymers according to the present invention may be applied not only to the homopolymerization of epihalohydrin to provide mainly acetone-soluble polymers which are amorphous elastic polymers with high molecular weight, but also to the copolymerization of epihalohydrin with other epoxy compounds. Representatives of the epoxy compounds to be polymerized are ethyleneoxide and propyleneoxide. Epihalohydrin such as epichlorohydrin and epibromohydrin may be mutually copolymerized.

The resultant polymers, especially amorphous elastic polymers, are vulcanized by polyamine, imidazoline etc. and have a variety of industrial uses as automobile or airplane parts, electric wire or cable coatings, hoses, belts, sealing materials, gaskets and so forth, depending upon their properties.

Now referring to the following examples, the present invention is described:

EXAMPLES

Polymerizations of epihalohydrin were conducted using 11.56 g (0.125 mol.) and 1.240 g (its molar ratio to the monomer: 0.05) of triisobutylaluminum in the presence of 40 ml (their volume ratio to the monomer: 4/1) of various kinds of a solvent adding sulfur with a variety of ratios.

The reactions were carried out in round bottomed glass tubes. At first a given quantity of solid sulfur was inserted into each of the tubes which were then connected to a vacuum line and evacuated. This system was filled with argon and further evacuated. Oxygen, water and other impurities were completely removed from inside the tubes. 4.0 ml of each of the solvents was injected into the polymerization tubes by an argon-filled injector after again filling the tubes with argon. The materials in the tubes were strongly stirred by electromagnetic stirrers to form a homogeneous system and heated, if necessary. As the materials were stirred, triisobutylaluminum was injected into the tubes and the addition of the monomer followed immediately. The mixtures were strongly stirred to make the polymerization system completely homogeneous and left thereafter in a static condition for further polymerization.

The reaction was continued for a required time at room temperature to be stopped by the addition of 5 ml of methanol to the reaction mixtures. The obtained slurry-like polymer dispersion was diluted by 50 ml of benzene and dropped into 500 ml of methanol solution containing 3 percent hydrochloric acid, as it was being stirred. The methanol-insoluble polymer was collected and separated after being left in another 500 ml of fresh methanol for 24 hours at room temperature and washed with fresh methanol. The resulting residue was deemed to be methanol-insoluble polymer. This was dried in vacuo for 24 hours at room temperature and weighed.

The proportion and the reduced viscosity of the acetone-soluble portion to decide the characteristics of the resultant polymer were measured as follows:

One hundred ml of benzene was added to 1 g of the polymer and this was slowly shaken to form a soluble portion and an insoluble portion which was rapidly swelling. The mixture was freeze-dried in this state. One hundred ml of acetone was added to 0.5 g of the dried polymer and left in a static condition for 24 hours. The insoluble portion was then separated and weighed after drying. The acetone-soluble portion was dried after eliminating acetone by distillation and weighed. Based on these results, the proportion of these two portions was set up. The reduced viscosity was measured in connection with the acetone-soluble portion and this is the measured value at 0.1 g/100 ml in acetone at 30° C. The obtained results are shown in the following table.

| Number | Solvent | Polymerizing time (hours) | Catalyst S/Al atomic ratio | Yield, percent | Methanol-insoluble polymer | | |
|---|---|---|---|---|---|---|---|
| | | | | | Acetone soluble portion, percent | Reduced viscosity | Nature of polymer |
| 1 | Benzene | 24 | 0 | 12.0 | 98.0 | 1.81 | Rubber-like elastomer. |
| 2 | do | 24 | 0.2 | 48.8 | 87.5 | 2.49 | Do. |
| 3 | do | 24 | 0.5 | 41.5 | 77.8 | 1.98 | Do. |
| 4 | do | 24 | 1.0 | 4.3 | 32.5 | 2.91 | Do. |
| 5 | do | 24 | 2.0 | Poor | | | Solid. |
| 6 | do | 24 | 3.0 | Poor | | | Do. |
| 7 | Monochlorobenzene | 20 | 0 | 10.1 | 89.6 | 1.16 | Rubber-like, viscous. |
| 8 | do | 20 | 0.2 | 22.9 | 80.0 | 2.60 | Rubber-like elastomer. |
| 9 | do | 20 | 0.4 | 25.8 | 90.8 | 2.43 | Do. |
| 10 | do | 20 | 0.6 | 19.3 | 90.7 | 2.12 | Do. |
| 11 | do | 20 | 1.0 | Poor | | | Solid. |
| 12 | do | 20 | 2.0 | Poor | | | Do. |
| 13 | 1,2-dichloro ethane | 24 | 0 | 35.4 | 95.4 | 0.65 | Rubber-like, viscous. |
| 14 | do | 24 | 0.1 | 64.4 | 73.4 | 1.82 | Rubber-like elastomer. |
| 15 | do | 24 | 0.2 | 79.9 | 72.8 | 1.10 | Do. |
| 16 | do | 24 | 0.6 | 61.5 | 80.7 | 1.68 | Do. |
| 17 | do | 24 | 1.0 | 2.8 | 87.2 | 1.85 | Do. |
| 18 | do | 24 | 2.0 | Poor | | | Solid. |
| 19 | do | 24 | 3.0 | Poor | | | Do. |
| 20 | 1,2-dichloro ethylene | 24 | 0 | 12.3 | 87.5 | 0.41 | Viscous. |
| 21 | do | 24 | 0.2 | 29.8 | 80.0 | 1.14 | Rubber-like elastomer. |
| 22 | do | 24 | 0.4 | 9.4 | 77.7 | 0.68 | Viscous. |
| 23 | do | 24 | 0.6 | 1.9 | | | Solid. |
| 24 | do | 24 | 1.0 | 3.8 | | | Do. |
| 25 | do | 24 | 2.0 | Poor | | | Do. |

WHAT IS CLAIMED IS:

1. In a method of producing epihalohydrin polymers wherein the polymerizing reaction is conducted in the presence of a catalyst comprising a trialkylaluminum and sulfur, the improvement which comprises utilizing a catalyst having a sulfur to aluminum atomic ratio of from 0.05 to 0.8, whereby a high molecular weight, elastomer is produced in high yield.

2. The method of claim 1 wherein said sulfur to aluminum atomic ratio is from about 0.1 to 0.7.

3. The method of claim 1 wherein said sulfur to aluminum atomic ratio is from about 0.2 to 0.5.

4. The method of claim 1 wherein said trialkylaluminum compound is triisobutylaluminum.

5. The method of claim 1 wherein said epihalohydrin polymers are selected from the group consisting of homopolymers of epichlorohydrin and epibromohydrin, copolymers of epichlorohydrin and epibromohydrin with each other and with vicinal monoepoxides.

* * * * *